(12) United States Patent
Kennedy et al.

(10) Patent No.: US 8,247,515 B2
(45) Date of Patent: Aug. 21, 2012

(54) AMPHIPHILIC GRAFTS AND CO-NETWORKS AND PROCESS FOR MAKING SAME

(75) Inventors: Joseph P. Kennedy, Akron, OH (US); Gabor Erdodi, Stow, OH (US)

(73) Assignee: The University of Akron, Akron, OH (US)

( * ) Notice: Subject to any disclaimer, the term of this patent is extended or adjusted under 35 U.S.C. 154(b) by 531 days.

(21) Appl. No.: 12/376,171

(22) PCT Filed: Aug. 3, 2007

(86) PCT No.: PCT/US2007/017312
§ 371 (c)(1),
(2), (4) Date: Oct. 22, 2009

(87) PCT Pub. No.: WO2008/019044
PCT Pub. Date: Feb. 14, 2008

(65) Prior Publication Data
US 2010/0048818 A1    Feb. 25, 2010

Related U.S. Application Data

(60) Provisional application No. 60/835,682, filed on Aug. 4, 2006.

(51) Int. Cl.
*C08G 77/08* (2006.01)

(52) U.S. Cl. ............... 528/31; 528/15; 528/32; 525/100

(58) Field of Classification Search .................... 528/15, 528/31, 32; 525/100
See application file for complete search history.

(56) References Cited

U.S. PATENT DOCUMENTS

| 4,725,648 A * | 2/1988 | Fujimoto et al. .............. 525/100 |
| 6,331,578 B1 | 12/2001 | Turner et al. |
| 2004/0152859 A1 | 8/2004 | Kunzler et al. |
| 2005/0165476 A1 | 7/2005 | Furst et al. |

OTHER PUBLICATIONS

Erdodi, G., et al., "Amphiphilic Conetworks: Definition, Synthesis, Applications", Progress in Polymer Science, Pergamon Press, Oxford, GB LNKD—DO!:10 1016/J, Progpolymsci., 2005, 11.001, vol. 31, No. 1, Jan. 1, 2006.

* cited by examiner

*Primary Examiner* — Margaret Moore
(74) *Attorney, Agent, or Firm* — Renner Kenner Greive Bobak Taylor & Weber (57) ABSTRACT

The present invention generally relates to amphiphilic grafts and co-networks made from at least one hydrophilic polymer and at least one hydrophobic polymer, and to processes for preparing such amphiphilic grafts and co-networks. In another embodiment, the present invention relates to amphiphilic co-networks formed from the combination of at least one polysiloxane and at least one polyacrylamide. In yet another embodiment, the present invention relates to amphiphilic co-networks formed from the combination of at least one polysiloxane, at least one polyacrylamide and at least one crosslinking agent.

50 Claims, 5 Drawing Sheets

AMPHIPHILIC GRAFTS AND CO-NETWORKS AND PROCESS FOR MAKING SAME

RELATED APPLICATION DATA

This application claims priority to previously filed U.S. Provisional Application No. 60/835,682, filed on Aug. 4, 2006, entitled "Amphiphilic Grafts and Co-Networks" and PCT/US2007/017312, filed Aug. 3, 2007, and entitled, "Ampliphilic Grafts and Co-Networks and Process for Making Same," The above-identified patent applications are hereby incorporated by reference in their entirety.

FIELD OF THE INVENTION

The present invention generally relates to amphiphilic grafts and co-networks made from at least one hydrophilic polymer and at least one hydrophobic polymer, and to processes for preparing such amphiphilic grafts and co-networks. In another embodiment, the present invention relates to amphiphilic co-networks formed from the combination of at least one polysiloxane and at least one polyacrylamide. In yet another embodiment, the present invention relates to amphiphilic co-networks formed from the combination of at least one polysiloxane, at least one polyacrylamide and at least one crosslinking agent.

BACKGROUND OF THE INVENTION

Many medical deficiencies and diseases result from the inability of cells to produce normal biologically active moieties. Many of these deficiencies can be remedied by implanting the needed biologically active moieties or pharmacological agents into the individual having the deficiency. A well known disease that can be remedied by implanting biological material or a pharmacological agent is Type I diabetes mellitus, wherein the production of insulin by pancreatic Langerhans islet cells is substantially deficient, impaired, or nonexistent.

For example, encapsulating human islet cells or tissues within a biologically compatible device followed by implanting the device into a host individual has been proposed as a means for providing insulin to an individual with Type I diabetes. However, an individual's immune response frequently attacks foreign biological material such as cells, tissues, and organs. Such a response severely limits the effectiveness of methods that involve implanting foreign biological material.

Porcine pancreatic islet cells can produce insulin, and their supply is much greater than that of human pancreatic islet cells. Therefore, transplanting porcine islet cells, if effectively immunoisolated from the normal immunological response of a human, would be of great benefit to a vast number of individuals with Type I diabetes.

Amphiphilic co-networks can serve as a means to encapsulate and thereby immunoisolate implantable biologically active moieties. Generally, amphiphilic co-networks comprise hydrophilic and hydrophobic polymers that can swell in both polar and non-polar solvents.

Additionally, amphiphilic networks and/or co-networks can be used to produce polymer films that swell in both polar and non-polar solvents. Accordingly, films made from amphiphilic polymer networks and/or co-networks have been found to be desirable in the production of contact lenses.

One problem associated with the synthesis of amphiphilic co-networks is how to overcome the thermodynamic incompatibility of the hydrophilic and hydrophobic constituents that will make up the amphiphilic co-network, and to unite two incompatible pre-polymers and/or polymers into a bi-continuous/bi-percolating construct. Typically, crosslinking of such systems is carried out in homogeneous solution in a common solvent at low pre-polymer and/or polymer concentrations, followed by the addition of a suitable crosslinker (i.e., by dissolving the two pre-polymers which are generally incompatible in their dry states). While this method yields uniform co-networks, the removal of the common solvent is accompanied by massive shrinkage, which renders the method technically impractical. Also, the dimensional stability of such co-networks is poor, the surface properties are hard to control, and the co-networks (or products formed therefrom) are fragile and difficult to manipulate.

Thus, there is a need in the art for reliable synthesis routes for amphiphilic co-networks. Additionally, there is a need for amphiphilic networks that are resistive to oxidative degradation. Specifically, desirable synthesis routes would include those that permit the control of one or more chemical and/or physical properties of amphiphilic co-networks. Also of interest are synthesis routes for amphiphilic co-networks that produce amphiphilic co-networks that are suitable for use in medical (e.g., cell encapsulation), biological and ophthalmic uses.

SUMMARY OF THE INVENTION

The present invention generally relates to amphiphilic grafts and co-networks made from at least one hydrophilic polymer and at least one hydrophobic polymer, and to processes for preparing such amphiphilic grafts and co-networks. In another embodiment, the present invention relates to amphiphilic co-networks formed from the combination of at least one polysiloxane and at least one polyacrylamide. In yet another embodiment, the present invention relates to amphiphilic co-networks formed from the combination of at least one polysiloxane, at least one polyacrylamide and at least one crosslinking agent.

In one embodiment, the present invention relates to a multicomponent network comprising the reaction product of at least one acrylamide polymer, at least one di-alkenyl or di-alkynyl terminated polysiloxane polymer and a crosslinking according to Formula (IV):

(IV)

In another embodiment, the present invention relates to a method for forming an amphiphilic network or co-network comprising the steps of: (A) combining at least one acrylamide polymer and at least one di-alkenyl or di-alkynyl terminated polysiloxane polymer to form a polymer mixture; (B) adding a crosslinking composition to the polymer mixture of Step (A) to form a polymer-crosslinker mixture, the one crosslinking composition having a chemical formula according to Formula (IV):

and (C) subjecting the polymer-crosslinker mixture to crosslinking to yield a crosslinked amphiphilic network or co-network.

In still another embodiment, the present invention includes a multicomponent network comprising the reaction product of: (i) at least one acrylamide polymer according to Formula (I):

where n is equal to an integer in the range of about 5 to about 5,000; (ii) at least one di-alkenyl or di-alkynyl terminated polysiloxane polymer according to Formula (II):

where m is equal to an integer in the range of about 5 to about 5,000; and (iii) a crosslinking according to Formula (IV):

DETAILED DESCRIPTION OF THE INVENTION

The present invention generally relates to amphiphilic grafts and co-networks made from at least one hydrophilic polymer and at least one hydrophobic polymer, and to processes for preparing such amphiphilic grafts and co-networks. In another embodiment, the present invention relates to amphiphilic co-networks formed from the combination of at least one polysiloxane and at least one polyacrylamide. In yet another embodiment, the present invention relates to amphiphilic co-networks formed from the combination of at least one polysiloxane, at least one polyacrylamide and at least one crosslinking agent.

Polymers:

As is discussed above, the crosslinked amphiphilic copolymer networks or co-networks of the present invention contain at least one hydrophobic polymer and at least one hydrophilic polymer.

In one embodiment, the present invention utilizes a combination of at least one polyacrylamide (e.g., poly(N,N-dimethyl acrylamide (PDMAAm))) with at least one di-alkenyl and/or di-alkynyl terminated siloxane polymer (e.g., polydimethylsiloxane (PDMS)) to form amphiphilic co-networks. In such an embodiment, the at least one polyacrylamide functions as the hydrophilic polymer, while the at least one di-alkenyl and/or di-alkynyl terminated polysiloxane siloxane polymer functions as the hydrophobic polymer. In one instance, each polymer used to form the amphiphilic co-networks of the present invention independently have from about 5 to about 5,000 repeating polymer units, or from about 10 to about 2,500 repeating polymer units, or from about 25 to about 1,000 repeating polymer units, or even from about 40 to about 500 repeating polymer units. Here, as well as elsewhere in the specification and claims, individual range limits may be combined.

It should be noted that the present invention is not limited to polymers having the above-mentioned number of repeating units. Instead, the present invention can utilize any suitable combination of hydrophilic and hydrophobic polymers having any number of repeating units so long as the polymers used can form amphiphilic co-networks. Another consideration that needs to be taken into account when choosing the polymers used to form the amphiphilic co-networks of the present invention is the intended use for the amphiphilic co-network. For example, if the amphiphilic co-network is going to be formed into a film to be used as a contact lens, then the polymers used in the present invention should at a minimum yield optically transparent amphiphilic co-networks. As would be apparent to one of ordinary skill in the art, depending upon the desired use for the amphiphilic co-networks of the present invention, one may have to take into consideration a wide variety of physical, chemical and/or mechanical properties of the polymers used to form such networks.

In another embodiment, the present invention utilizes a combination of at least one polydimethyl acrylamide polymer with at least one polydimethylsiloxane polymer. Exemplary acrylamide polymer (e.g., poly(N,N-dimethyl acrylamide (PDMAAm))) and polydimethylsiloxane polymers (e.g., vinyl ditelechelic polydimethylsiloxane (V-PDMS-V)) are shown below in Formulas (I) and (II), respectively, (I)

where n is equal to an integer in the range of about 5 to about 5,000, or from about 10 to about 2,500, or from about 25 to about 1,000, or even from about 40 to about 500, and (II)

where m is equal to an integer in the range of about 5 to about 5,000, or from about 10 to about 2,500, or from about 25 to about 1,000, or even from about 40 to about 500. It should be noted that the present invention is not limited to just the acrylamide polymer and polydimethylsiloxane polymers of Formulas (I) and (II). Rather, in this embodiment any suitable combination of acrylamide polymer and di-alkenyl and/or di-alkynyl terminated polydimethylsiloxane polymers can be used.

The polydimethylsiloxane polymer of Formula (II) can also, for example, be purchased from Gelest, Tulleytown, Pa. Alternatively, if so desired, the polymers of Formulas (I) and (II) could be synthesized, thereby permitting one to control the number of repeating units present in the polymer of Formula (II).

In another embodiment, the at least one di-alkenyl and/or di-alkynyl terminated polydimethylsiloxane polymer utilized in the present invention can be selected from any polymer according to Formula (III) shown below:

(III)

where p is equal to an integer in the range of about 5 to about 5,000, or from about 10 to about 2,500, or from about 25 to about 1,000, or even from about 40 to about 500; and where $R_1$ and $R_2$ are independently $C_1$ to $C_6$ alkyl groups, or even $C_1$ to $C_4$ alkyl groups, and $R_3$ and $R_4$ are independently $C_2$ to $C_{10}$ alkenyl groups, $C_2$ to $C_7$ alkenyl groups, or even $C_2$ to $C_5$ alkenyl groups. In another embodiment, $R_3$ and $R_4$ are independently $C_2$ to $C_{10}$ alkynyl groups, $C_2$ to $C_7$ alkynyl groups, or even $C_2$ to $C_5$ alkynyl groups. Again, here, as well as elsewhere in the specification and claims, individual range limits may be combined.

In still another embodiment, $R_1$ and $R_2$ are identical substituent groups (e.g., all methyl groups, all propyl groups or all butyl groups), and $R_3$ and $R_4$ are identical substituent groups (e.g., all vinyl groups or all alkenyl groups).

Crosslinker:

In one embodiment, the present invention utilizes a silicon-containing crosslinker. Suitable silicon-containing crosslinking compositions include, but are not limited to, multi-SiH functional cyclosiloxanes. In one embodiment, the crosslinker of the present invention is or is derived from one or more alkyl-substituted cyclopentasiloxane compositions (e.g., pentamethylcyclopentasiloxane—$D_5H$). Pentamethyl-cyclopenta-siloxane ($D_5H$) is available commercially and its structure is shown below in Formula (IV):

(IV)

Other crosslinking compositions in addition to the crosslinking compound shown above can be utilized in conjunction with the present invention, and the present invention is not limited to just the above crosslinking composition.

Figure 1:
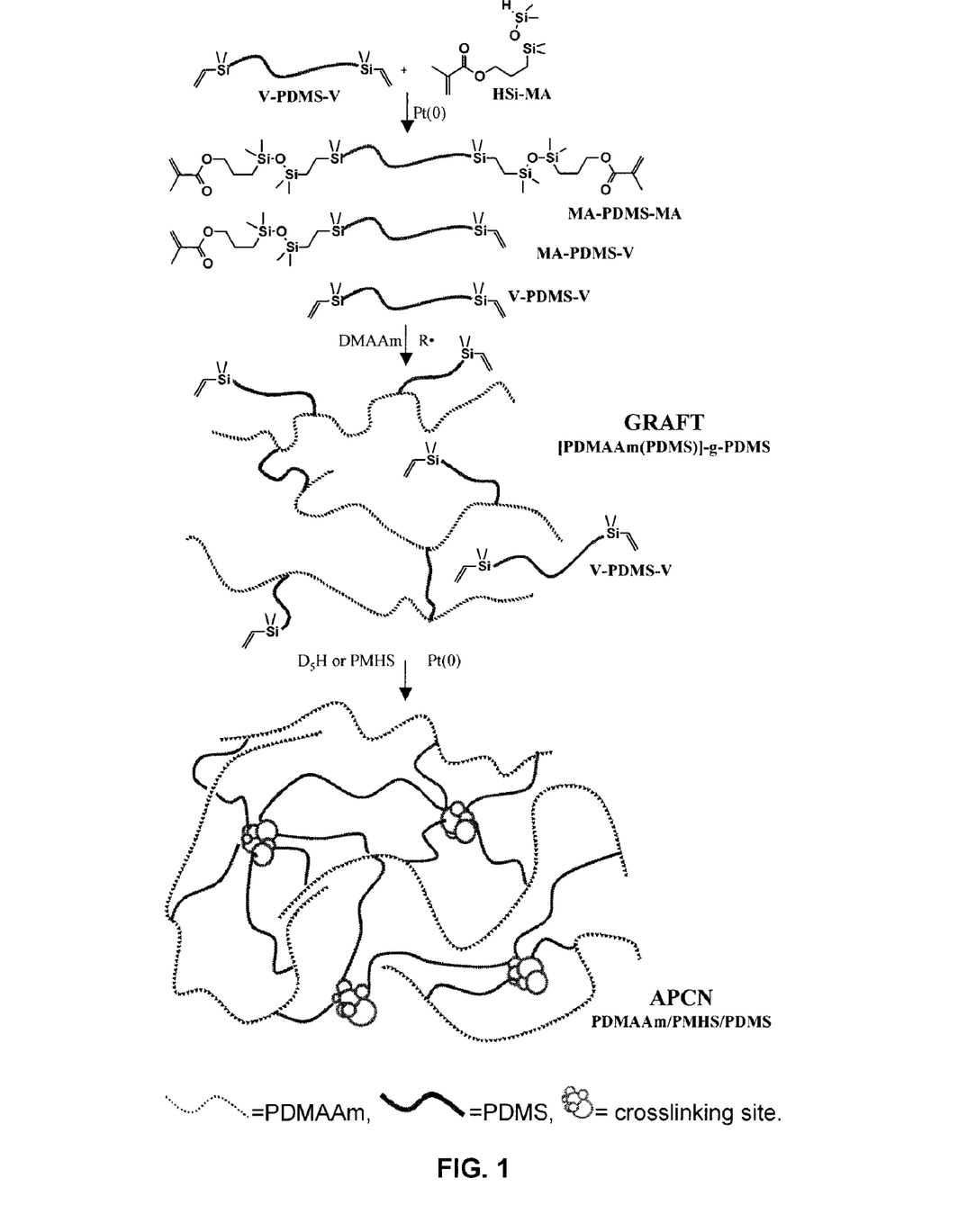
FIG. 1 is an illustration of a reaction scheme detailing the synthesis of an amphiphilic network and/or co-network according to one embodiment of the present invention; together with the abbreviations used.

Crosslinking and Formation of Amphiphilic Co-Networks:

In one embodiment, amphiphilic copolymer networks and/or co-networks are synthesized by using at least one multi-SiH functional cyclosiloxane crosslinker (e.g., $D_5H$). FIG. 1 outlines the starting ingredients for one embodiment according to the present invention, and shows an idealized structure of an amphiphilic co-network that has been crosslinked via poly-condensed $D_5H$ ($PD_5$) domains.

In this embodiment, the synthesis of an amphiphilic co-network is formed from the combination of PDMAAm, V-PDMS-V and $D_5H$ as will be explained in detail below. It should be noted that the present invention is not limited solely to this embodiment. Rather, the present invention should be broadly construed in view of the disclosure contained herein.

Materials:

Polydimethylsiloxane (V-PDMS-V, nominal $M_w$=17,000 grams/mole, provided by the supplier, $M_{n,NMR}$=14,000 grams/mole determined by the authors), tetramethyldisiloxane, pentamethylcyclopentasiloxane ($D_5H$), polymethylhydrosiloxane (PMHS, nominal $M_w$=2,000 g/mol), Karstedt's catalyst (3% Pt(0) in xylene, "low color") are purchased from Gelest, Tulleytown, Pa. N,N-dimethyl acrylamide (DMAAm), azobisisobutylonitrile (AIBN), allyl methacrylate, phosphorous acid (85%), triphenylphosphine ($PPh_3$), and the solvents tetrahydrofuran, toluene, n-hexane, and chloroform are obtained from Aldrich. PDMAAm is prepared by free radical polymerization of N,N-dimethyl acrylamide (DMAAm) in 30% toluene solution in the presence of AIBN initiator (DMAAm/AIBN=200) at 65° C.; $M_w$=80,000 grams/mole by GPC-LS.

Instrumentation:

$^1$H NMR spectra are acquired on a Varian Unity plus 400 MHz spectrometer with the use of $CDCl_3$ solvent. GPC eluograms are obtained on a Waters GPC instrument equipped with a series of six Styragel columns (HR 0.5, HR 1, HR 3, HR 4, HR 5, and HR 6; Waters), a refractive index (RI) detector (Optilab, Wyatt Technology), a dual-ultraviolet absorbance detector (Waters 2487), a laser light scattering detector (Minidawn, Wyatt Technology) and a viscometer (Viscostar, Wyatt Technology). Samples are dissolved in THF and the flow rate is determined to be 1 mL of THF/min.

Synthesis of 2-Propenoic acid-3-(1,1,3,3-tetramethyldisiloxanyl)propyl ester (SiH—MA):

Into a 1000 mL round bottom flask, equipped with a Teflon-coated stir bar and located in a water bath at room temperature, is added tetramethyidisiloxane (134 grams, 1 mole) and allyl methacrylate (126 grams, 1 mole). A reaction is initiated by the addition of Karstedt's catalyst (0.5 mL) and the charge is stirred for 3 hours. At this point $PPh_3$ (10 mL) is added and the charge is vacuum distilled (0.1 millibar) at 50° C. The product, 112 grams of colorless liquid, is rectified on a spinning band column (75 plates, 0.3 mbar) to yield 41 grams (16%) of SiH-MA. The boiling point is determined to be 62° C.

Synthesis of MA-PDMS-V:

V-PDMS-V (20 grams, 1.4 mmoles) and SiH—MA (0.37 grams, 1.4 mmoles) dissolved in 23 mL of toluene at room temperature is placed in a 500 mL Erlenmeyer flask equipped with a Teflon coated stir bar. A reaction is initiated by the addition of Karstedt's catalyst (0.02 mL), and the charge is stirred and heated for two hours at a temperature of 50° C. The components of the charge are not separated, and the solution of the product mixture is used as is, for the preparation of grafts.

The product is then analyzed by $^1$H NMR spectroscopy and GPC. The average methacrylate (MA) functionality is 1.0 (i.e., MA/PDMS=1.0). According to GPC analysis the overall shape of GPC traces did not change as a result of end functionalization.

Synthesis of [PDMAAm(PDMS)]-g-PDMS-V:

In a 1000 mL Erlenmeyer flask are placed toluene (383 mL, 340 grams), freshly distilled DMAAm (20 grams, 177 mmoles), and a mixture of MA-functionalized PDMS (MA/PDMS=1.0; 20 grams in 43 mL of toluene). The solution is then deareated by sparging with Ar for 5 minutes, AIBN (0.3 mg, 0.18 mmoles) is added, the flask is then hermetically sealed with a Teflon stopcock, and placed in a heating oven for 24 hours at 65° C. After terpolymerization, the bulk of the toluene is evaporated under reduced pressure, and the product is dried, in vacuum, at room temperature for 2 days. The yield is 38 grams of a brittle white material.

Synthesis of PDMAAm/$PD_5$/PDMS and PDMAAm/PMHS/PDMS Co-Networks:

Crosslinkinq with $D_5H$.:

Karstedt's catalyst (0.05 mL) is added to a solution of [PDMAAm(PDMS)]-g-PDMS-V (0.9 grams, 0.032 mmoles of vinyl groups) and $D_5H$ (0.1 grams, 0.33 mmoles) that is previously dissolved in 10 grams of $CHCl_3$, the resulting solution is stirred at room temperature for 24 hours. The solution is then poured into a Teflon mold (10×10 cm) and placed into an oven at 70° C. for 24 hours. After crosslinking is complete, the resulting polymer is removed from the mold, exhaustively extracted with water (3×500 mL/day) and dried, in vacuum, at room temperature. The total amount of water extractable (sol) fraction is 5% indicating a high degree of crosslinking. The product is a colorless optically clear flexible film, which can be handled manually thereby suggesting a reasonable combination of mechanical properties. The product swells both in water and n-hexane indicating APCN character.

Crosslinking with PMHS:

Crosslinking with PMHS is similar to crosslinking with $D_5H$, except PMHS (0.1 grams, 1.66 mmoles of SiH groups) are used instead of $D_5H$. The total amount of water extractable (sol) fraction is 2% indicating essentially complete crosslinking. The dry product, a transparent flexible material, swells both in water and n-hexane indicating APCN character.

Crosslinking in the Presence of Added PDMAAm:

To [PDMAAm(PDMS)]-g-PDMS-V (0.9 grams, 0.032 mmoles of vinyl groups) and PMHS (0.1 grams, 1.66 mmoles of SiH groups) dissolved in 10 grams of $CHCl_3$ are added PDMAAm ($M_w$=80,000 grams/mole, 0.05 grams) dissolved in 10 grams (11.3 mL) of THF. Then Karstedt's catalyst (0.05 mL) is added and the solution is stirred for one hour at room temperature. The charge is poured into a Teflon mold (10×10 cm) and placed into an oven for 24 hours at 70° C. After crosslinking, the polymer is removed from the mold, exhaustively extracted with water (3×500 mL/day), and dried, in vacuum, at room temperature. The total amount of water extractable (sol) is 3% indicating essentially complete crosslinking. The dry product is a white flexible material that swells both in water and n-hexane indicating APCN character.

Methods:

Swelling Measurements:

Pre-weighed samples of membranes are placed in distilled water and the extent of swelling is determined periodically by removing the membranes from the water, removing the water adsorbed to the surfaces by blotting with tissue paper, and weighing. Equilibrium water swelling ($S_w$) is recorded at room temperature when the weight of the water-swollen membranes remained unchanged for 24 hours. The following equation is used to express the data:

$$S_w = 100\ (m_{swollen} - m_{dry})/m_{dry}$$

where $m_{swollen}$ is the mass of the water swollen membrane and $m_{dry}$ is the mass of the dry membrane. Equilibrium water swelling of the PDMAAm domain is calculated by:

$$S_{w,PDMAAm} = 100\ (m_{swollen} - m_{dry}\ W_{PDMAAm}\ 0.01)/(m_{dry}\ W_{PDMAAm}\ 0.01)$$

where $W_{PDMAAm}$ is the PDMAAm content of the membrane (wt %). The weight fraction of PDMS in the swollen state is calculated by:

$$W_{sw,PDMS} = 100\ (m_{dry}\ W_{PDMS}\ 0.01)/m_{swollen}$$

where $W_{PDMS}$ is the PDMS content of the membrane (wt %).

Results and Discussion:

The Synthesis Strategy:

FIG. 1 helps to visualize the synthesis strategy, the starting materials, the microstructures of the products, and shows the abbreviations used. The graft is abbreviated by [PDMAAm(PDMS)]-g-PDMS-V, where (PDMS) indicates the presence of the PDMS crosslinking segments in "the backbone". The abbreviation of the amphiphilic co-network, e.g., PDMAAm/PHMS/PDMS, indicates, in sequence, the hydrophilic moiety/the crosslinking agent/the hydrophobic moiety. In one embodiment, the first step is the hydrosilation of V-PDMS-V by SiH—MA at a stoichiometric ratio of 1:1 in the presence of Karstedt's catalyst. The reaction produces a statistical three component mixture consisting of MA-PDMS-V (50%, the macromonomer), MA-PDMS-MA (25%, the first crosslinker), and unreacted starting material V-PDMS-V (25%, the second crosslinker). In this embodiment, all three moieties are needed and will be utilized.

The second step is a free radical terpolymerization of DMAAm with MA-PDSM-V and MA-PDMS-MA to yield a high molecular weight slightly crosslinked soluble graft consisting of PDMAAm main chains carrying -PDMS-V branches. The vinylsilyl termini do not copolymerize with the MA groups therefore the product remains soluble. The terpolymerization is controlled, in this embodiment, not to reach the gel point by controlling the molecular weight of the terpolymer by adjusting the initiator (AIBN) concentration. In the third and final step, the graft is co-crosslinked to yield the target APCN by hydrosilating the pendant vinylsilane groups with the second crosslinker V-PDMS-V with a polyhydrosiloxane ($D_5H$ or PMHS). The -PDMS-V and the polyhydrosiloxane are hydrophobic, and are sequestered in the PDMS domains, therefore the solidification of the PDMAAm domains does not prevent crosslinking. The APCN is optically clear indicating the absence of massive phase coalescence. Domain aggregation during crosslinking/film casting is absent because the PDMAAm and PDMS are covalently linked already in the graft stage (see FIG. 1).

The APCN contains two kinds of PDMS strands (see FIG. 1): one that connects a PDMAAm segment with a crosslinking site, i.e., formed by crosslinking via hydrosilation of -PDMS-V branches with the polyhydrosiloxane ($D_5H$ or PMHS), and one that connects two crosslinking sites, i.e., formed by crosslinking via hydrosilation of V-PDMS-V with the polyhydrosiloxane. Thus all three components that arose in the first reaction are incorporated into the APCN and fulfill important functions.

The above-mentioned APCNs are designed with immunoisolatory membranes in mind. It has been found that swelling data is a good predictor of glucose, insulin, and oxygen permeabilities, i.e., glucose and insulin diffusivities are proportional to the volume fraction of the hydrophilic domain in the co-network and the swelling ratio of the PDMAAm ($S_{w,PDMAAm}$), and that oxygen permeability is proportional to the volume fraction of PDMS in water swollen membranes. Thus, simple swelling studies provide important guidance for optimizing synthesis conditions.

Figure 2:
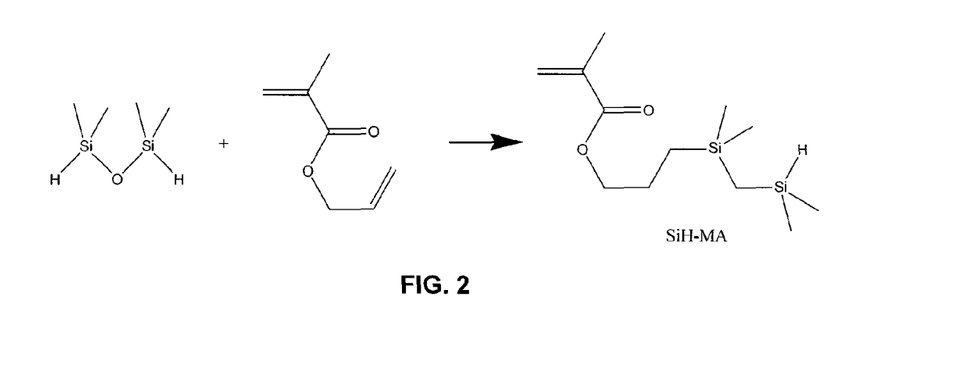
FIG. 2 illustrates the synthesis of the end-functionalizing agent SiH—MA.

The Synthesis and Characterization of the End-functionalizing Agent, SiH—MA:

In one embodiment, the present invention begins with the synthesis of Si—MA (see FIG. 2 which illustrates the synthesis of the end-functionalizing agent SiH—MA). The function of Si—MA is to convert V-PDMS-V to PDMS with MA termini, i.e., to produce the macromonomer MA-PDMS-V and the first crosslinker MA-PDMS=MA.

The synthesis proceeds smoothly and the product is isolated by distillation. In one embodiment, it is determined to be essential to add $PPh_3$ to the charge prior to distillation to prevent the in-situ polymerization of SiH—MA at elevated temperatures. $PPh_3$, a catalyst poison, prevents the oxidation of SiH groups in the presence of moisture (and/or other protic contaminants) to radicals, which would mediate the polymerization of SiH—MA. In the presence of $PPh_3$ the system is sufficiently stable and gives reasonable yields of SiH—MA.

Figure 3:
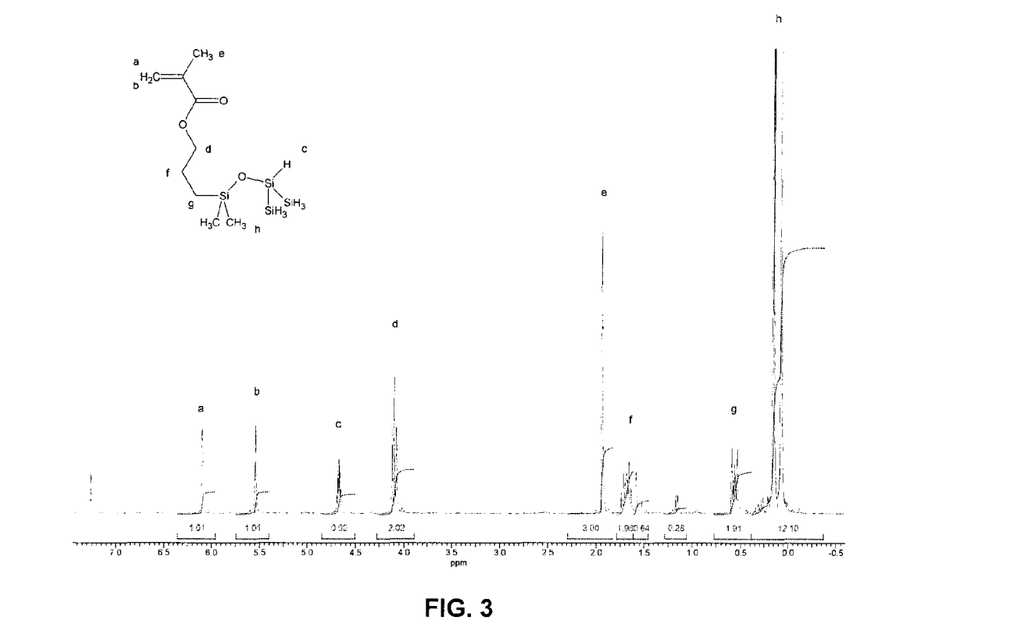
FIG. 3 is a $^1$H NMR spectrum of SiH—MA.

The structure of the SiH—MA is confirmed by $^1H$ NMR spectroscopy (see FIG. 3). As can be seen from FIG. 3 the spectra shows a multiplet at 4.67 ppm which indicates the presence of the SiH group, and characteristic resonances at 1.9, 5.6 ppm (for the olefinic) and 6.2 ppm (for the methyl protons), associated with the MA group. SiH—MA was virtually quantitatively combined with V-PDMS-V by hydrosilation, and thus PDMS with MA termini was obtained (see below).

The Synthesis of MA-PDMS-V:

The macromonomer MA-PDMS-V is prepared by hydrosilation of V-PDMS-V with SiH—MA using stoichiometric quantities of the starting materials, V-PDMS-V:SiH—MA=1: 1. The product is a statistical mixture of MA-PDMS-MA (25%), MA-PDMS-V (50%), and unreacted V-PDMS-V (25%) (See step one in FIG. 1).

Figure 4:
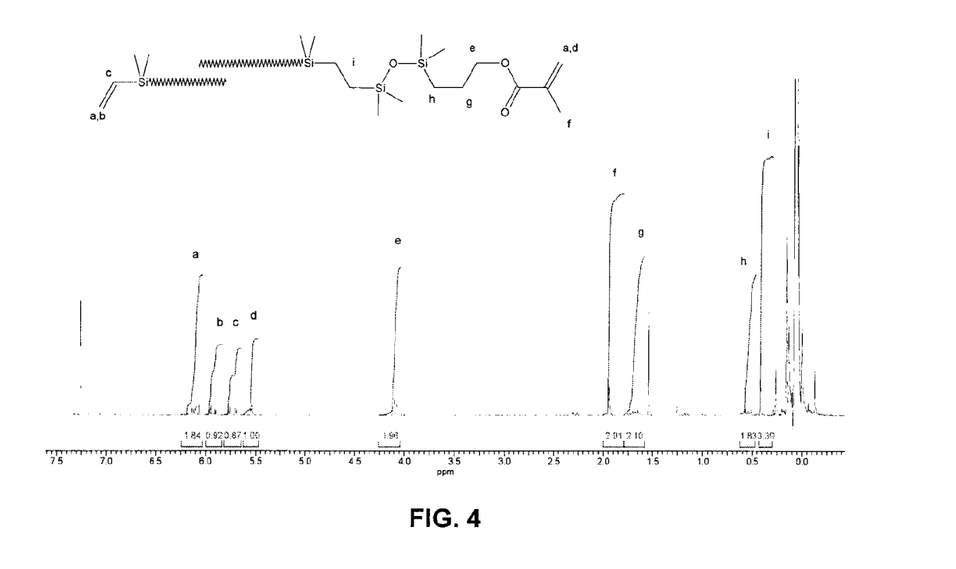
FIG. 4 is a $^1$H NMR spectrum of a product mixture according to the present invention.

FIG. 4 shows the $^1H$ NMR spectrum of the mixture, and shows resonances characteristic of both methacrylate (a, d and f protons) and vinylsilyl (a, b and c protons) groups. The resonances associated with the SiH proton (4.67 ppm) have completely disappeared. The resonance for the $CH_2$ protons, which arose via hydrosilation of Si—CH=$CH_2$ by SiH— MA, appear at 0.4 ppm (i protons).

The main product, MA-PDMS-V is in fact a macromonomer, whose MA group copolymerizes with DMAAm (see Step 2 in FIG. 1), and yields a graft with -PDMS-V branches. The vinylsilyl termini are un-reactive with MA under free radical conditions, however, they are needed for crosslinking by hydrosilation (see Step 3 in FIG. 1).

The reaction mixture is used as is, i.e., without separating the individual molecules, to prepare a high molecular weight graft fitted with —Si—CH=$CH_2$ groups (see graft in FIG. 1). In one embodiment, the syntheses of grafts using charges with V-PDMS-V/SiH—MA stoichiometries below or above unity (i.e., with 0.5, 0.8, 1.5) yields products unsatisfactory for some applications as the products are, for example, opaque, microphase separated grafts, or have insoluble fractions.

The Synthesis of the Graft [PDMAAm(PDMS)]-g-PDSM-V:

The synthesis of this graft entails the free radical mediated terpolymerization of DMAAm with the MA-PDMS-V macromonomer and the MA-PDMS-MA crosslinker, and yields a high molecular weight graft consisting of PDMAAm main chains carrying -PDMS-V branches slightly crosslinked with PDMS segments. Due to the presence of MA-PDMS-MA in the charge (see Step 2 in FIG. 1) the graft is slightly crosslinked and of high molecular weight. The MA-PDMS-MA copolymerizes with DMAAm, and it beneficially increases the molecular weight and broadens the molecular weight distribution of the graft. The vinylsilyl groups in V-PDMS-V do not copolymerize with methacrylates under free radical conditions. The unreacted starting material V-PDMS-V "takes a ride" and will be incorporated into the target co-network during crosslinking (see Step 3 in FIG. 1). FIG. 1 shows an idealized microarchitecture of a graft; the presence of the unreacted V-PDMS-V is indicated adjacent to the graft.

Since the copolymerization is stopped before the gel point, the product is soluble and, after drying, can be re-dissolved in various solvents (toluene, chloroform, tetrahydrofuran, etc.). Let it be stressed that although the charge contained approximately 25% MA-PDMS-MA, the graft did not contain gel because the molecular weight of the main chain was controlled by the initiator (AIBN) concentration. Relatively high initiator concentrations decrease molecular weights, while lower initiator concentrations lead to relatively higher molecular weights. Depending on the molecular weight and overall composition, the product is a colorless rigid or waxy, and opaque or optically clear material.

The molecular weight of the graft strongly affects the properties of the target co-network. In one embodiment, low molecular weight grafts lead to many dangling PDMAAm chain ends in the final co-network; the dangling ends increase water swelling and thus desirably increase aqueous diffusion, however, they weaken the co-network on account of reduced crosslink densities.

Figure 5:
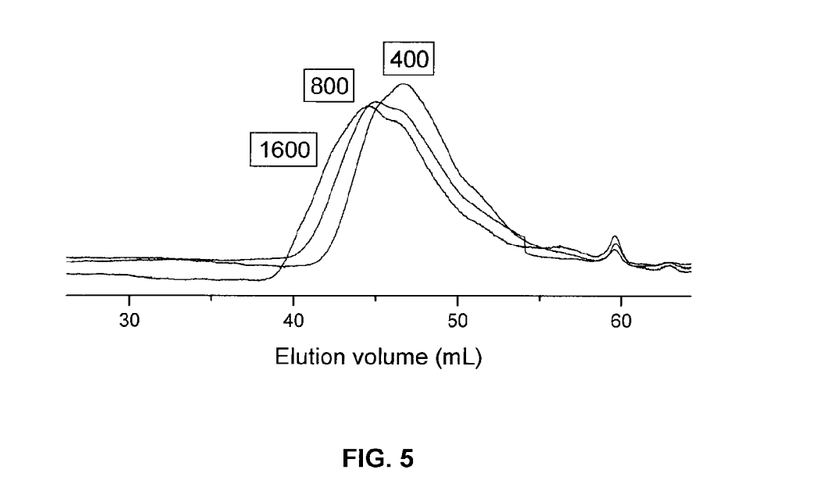
FIG. 5 is a graph of GPC traces of representative [PDMAAm(PDMS)]-g-PDMS-V grafts prepared with different DMAAm:AIBN ratios (400, 800 and 1600)

FIG. 5 shows the GPC traces of the three representative grafts prepared with different AIBN concentrations. The traces suggest high molecular weight somewhat heterogeneous products, which is not surprising in view of the complexity of the terpolymerization. The position of the main elution peaks of the grafts shift to lower elution volumes with decreasing AIBN concentrations. High molecular weight soluble grafts can be formed, in one embodiment, only if the average arm number of the graft is in the 2 to 5 range. If the arm number is less than two, networks cannot form, and if it is larger than five, the graft contains gel. Since the molecular weight of the PDMS branch is the same in all charges (17,000 grams/mole), the molecular weight of the PDMAAm needs to be decreased to keep the arm number in the desirable range.

TABLE 1

Charges[a] and Overall Graft Compositions

| Graft designation | MA-PDMS-V MA-PDMS-MA V-PDMS-V (g) | DMAAm (g) | DMAAm/AIBN (mol/mol) | PDMAAm in the graft (wt %) | Elution volume of main peak (mL) |
|---|---|---|---|---|---|
| 20[b]-200[c] | 4 | 16 | 200 | 20 | 42.9 |
| 35-400 | 7 | 13 | 400 | 35 | 41.4 |
| 50-400 | 10 | 10 | 400 | 50 | 44.4 |
| 50-800 | 10 | 10 | 800 | 50 | |
| 50-1600 | 10 | 10 | 1600 | 50 | 42.9 |

[a]All charges contained 180 g toluene;
[b]PDMAAm content of the graft, and
[c]DMAAm/AIBN ratio Table 1 summarizes the amount in grams of the charges, the amount in grams of DMAAm added to the charges, the ratio in mol/mol of DMAAm/AIBN, the weight percent of PDMAAm in the graft, and the elution volume in mL of the main GPC peak. According to the last parameter, the molecular weights of the grafts are high (above 100,000 grams/mole, as estimated by polystyrene calibration). Since the relative amounts of PDMAAm and PDMS are not constant, and the product is branched, accurate molecular weight cannot be determined by GPC.

Figure 6:
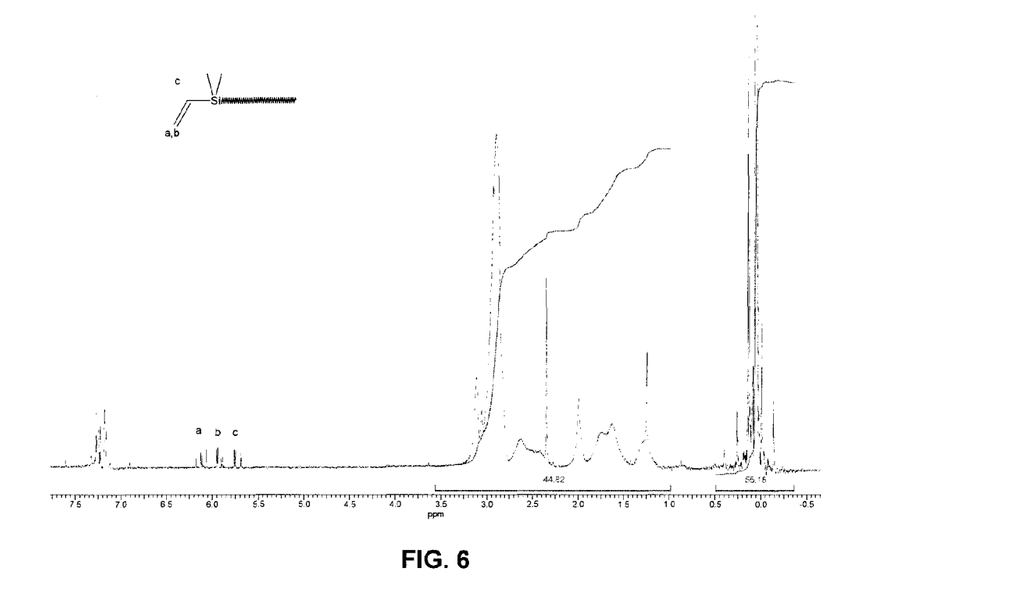
FIG. 6 is a $^1$H NMR spectrum of a [PDMAAm(PDMS)]-g-PDMS-V (sample 35-400 in Table 1)

FIG. 6 shows the $^1$H NMR spectra of a representative graft. The spectrum of FIG. 6 indicates the presence of 0.036 mmoles vinylsilyl groups/g product (calculated from the ratio of PDMS protons at 0 ppm and vinylsilyl protons at 5.5 to 6.5 ppm). The absence of MA groups indicates their essentially complete conversion.

Crosslinking the Graft to Amphiphilic Co-Network (APCN):

The target APCN is obtained by co-crosslinking the -PDMS-V branches of the graft and V-PDMS-V with polyhydrosiloxanes, $D_5H$ or PMHS, in the presence of a platinum (Pt) catalyst.

Figure 7:
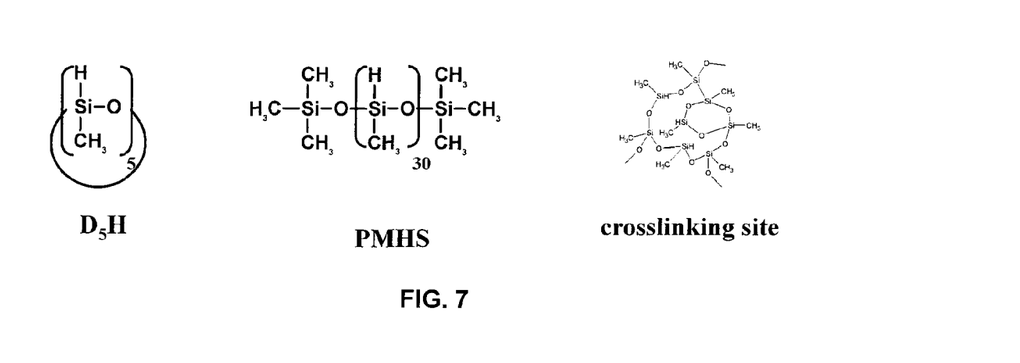
FIG. 7 are chemical formulas of select components utilized in one embodiment of the present invention.

While not wishing to be bound to any one theory, it is believed that the crosslinking sites in these APCNs arise by co-hydrosilation of PDMS-V branches and V-PDMS-V by polyhydrosiloxanes ($D_5H$ or PMHS) in the presence of Karstedt's catalyst and traces of moisture. Since the structures of $D_5H$ and PMHS are similar, and since crosslinking by hydrosilation/condensation with these crosslinkers is similar, the crosslinking sites that arise from these crosslinkers are also believed to be similar. FIG. 7 shows the structures of $D_5H$ and PMHS, and an idealized structure of a crosslinking site in the present invention's APCNs, i.e., a complex system of condensed silsesquioxane rings similar to the microstructure of $PD_5$. The ring clusters shown in FIG. 1 symbolize these complex crosslinking sites.

The graft, the crosslinker ($D_5H$ or PMHS), and the catalyst are soluble in toluene, and crosslinking by casting these solutions onto various surfaces (Teflon, glass, stainless steel) produces colorless optically clear membranes. FIG. 1 shows an idealized microstructure of an APCN.

Crosslinking accelerates during solvent evaporation because the concentration of the chain ends increases. Eventually a phase-separated product is formed, however, crosslinking continues within the hydrophobic (PDMS) domains. Since both the vinylsilyl and the SiH groups are connected to hydrophobic chains and therefore are sequestered within the rubbery PDMS domains, solidification of the separate glassy PDMAAm domains during crosslinking does not prevent hydrosilation. Crosslinking occurs below the $T_g$ of the PDMAAm phase ($T_g$=114° C.) and the overall morphology of the APCN changes constantly during curing, as indicated by the originally opaque/white films turning gradually optically clear. The optical clarity of the membranes both in the dry or wet sate suggests domain dimensions well below the wavelength of visible light, most likely in the 10 to 40 nm range. Indeed, massive phase coalescence and/or domain aggregation cannot occur during crosslinking/casting because the PDMAAm and PDMS segments are covalently connected already in the graft.

Since the rate of crosslinking with $D_5H$ is relatively slow (minutes to hours) and is relatively sensitive to conditions (i.e., moisture content, nature of the solvent, solvent evaporation rate, time before casting, etc.), experiments were preferentially carried out with PMHS which provides faster and more reproducible crosslinking. The repeat units of these polyhydrosiloxanes are identical, —SiH(CH$_3$)—O—, except $D_5H$ is cyclic whereas PMHS is linear, and it contains about six times as many SiH groups per molecule as $D_5H$ (see FIG. 7). Indeed crosslinking was much faster and much less sensitive to solvent related issues with PHMS than with $D_5H$.

In view of the great structural similarity of $D_5H$ and PMHS, the gross structures of the crosslinking sites formed from these moieties are expected to be similar. Since $D_5H$ and PMHS contain the same repeat units, thus the chemical transformations, which occur during crosslinking with these polyhydrosiloxanes, are expected to produce similar crosslinking sites, i.e., mixtures of different sized polysiloxane/silsesquioxane rings (indicated in FIG. 1).

Table 2 summarizes experiments carried out to explore synthesis conditions, specifically, to investigate conditions leading to appropriate swelling characteristics. Swelling data are important guidance to the ultimate membrane properties.

TABLE 2

Charges, Compositions, and Swelling of APCNs

| | | APCN | | | | | | | | | |
|---|---|---|---|---|---|---|---|---|---|---|---|
| | | Charges | | | | | PDMAAm Homopolymer | | Properties | | |
| | | Graft | | Crosslinker | | | | | | | |
| Sample[a] | Code | Conc. (wt %) | Charge (mg) | $D_5H$ (wt %) | PMHS (wgt %) | Charge (mg) | Conc. (wgt %) | Charge (mg) | Sol Fraction (wgt %) | $S_w$ (%) | $S_{w,PDMAAm}$ (%) | $W_{sw,PDMS}$ (%) |

| Sample[a] | Code | Conc. (wt %) | Charge (mg) | $D_5H$ (wt %) | PMHS (wgt %) | Charge (mg) | Conc. (wgt %) | Charge (mg) | Sol Fraction (wgt %) | $S_w$ (%) | $S_{w,PDMAAm}$ (%) | $W_{sw,PDMS}$ (%) |
|---|---|---|---|---|---|---|---|---|---|---|---|---|
| *Composition of the Co-Network* | | | | | | | | | | | | |
| PDMAAm$_{18}$/PMHS$_{10}$/PDMS$_{72}$ | G20-200 | 90 | 450 | 0 | 10 | 50 | 0 | 0 | 5.3 | 18 | 67 | 73 |
| PDMAAm$_{32}$/PMHS$_{10}$/PDMS$_{59}$ | G35-400 | 90 | 450 | 0 | 10 | 50 | 0 | 0 | 3.2 | 33 | 105 | 52 |
| PDMAAm$_{45}$/PMHS$_{10}$/PDMS$_{45}$ | G50-1600 | 90 | 450 | 0 | 10 | 50 | 0 | 0 | 2.7 | 60 | 133 | 34 |
| *Effect of Crosslinker Concentration* | | | | | | | | | | | | |
| PDMAAm$_{48}$/PMHS$_{14}$/PDMS$_{48}$ | G50-1600 | 96 | 480 | 0 | 4 | 20 | 0 | 0 | 9 | 89 | 185 | 28 |
| PDMAAm$_{47}$/PMHS$_{7}$/PDMS$_{48}$ | G50-1600 | 93 | 465 | 0 | 7 | 35 | 0 | 0 | 4.3 | 67 | 149 | 33 |
| PDMAAm$_{45}$/PMHS$_{10}$/PDMS$_{45}$ | G50-1600 | 90 | 450 | 0 | 10 | 50 | 0 | 0 | 2.7 | 60 | 133 | 34 |
| PDMAAm$_{43}$/PMHS$_{15}$/PDMS$_{42}$ | G50-1600 | 85 | 425 | 0 | 15 | 75 | 0 | 0 | 5.3 | 73 | 152 | 30 |
| *Effect of the Molecular Weight of the [PDMAAm(PDMS)]-g-PDMS Graft Copolymer* | | | | | | | | | | | | |
| PDMAAm$_{45}$/PMHS$_{4}$/PDMS$_{51}$ | G50-400 | 90 | 450 | 0 | 10 | 50 | 0 | 0 | | 97 | 215 | 28 |
| PDMAAm$_{45}$/PMHS$_{4}$/PDMS$_{51}$ | G50-800 | 90 | 450 | 0 | 10 | 50 | 0 | 0 | | | | |
| PDMAAm$_{45}$/PMHS$_{4}$/PDMS$_{51}$ | G50-1600 | 90 | 450 | 0 | 10 | 50 | 0 | 0 | 2.7 | 60 | 133 | 34 |
| *Morphology Modification of APCNs by Blending and Extraction of Homo-PDMAAm* | | | | | | | | | | | | |
| PDMAAm$_{48}$/D$_5$H$_4$/PDMS$_{48}$ | G50-800 | 90 | 480 | 4.3 | 0 | 20 | 0 | 0 | 7.2 | 92 | 190 | 27 |
| PDMAAm$_{48}$/D$_5$H$_4$/PDMS$_{48}$ | G50-800 | 90.9 | 480 | 4.0 | 0 | 20 | 5.1 | 25 | 13 | 155 | 320 | 20 |
| PDMAAm$_{48}$/D$_5$H$_4$/PDMS$_{48}$ | G50-800 | 86.5 | 480 | 3.8 | 0 | 20 | 9.6 | 50 | 19 | 220 | 460 | 16 |
| PDMAAm$_{48}$/D$_5$H$_4$/PDMS$_{48}$ | G50-800 | 78.9 | 480 | 3.5 | 0 | 20 | 17.5 | 100 | 25 | 300 | 620 | 13 |
| PDMAAm$_{48}$/D$_5$H$_4$/PDMS$_{48}$ | G50-800 | 69.8 | 480 | 3.1 | 0 | 20 | 27.1 | 175 | 42 | 380 | 790 | 11 |

[a]The numbers in the sample indicate the final composition of the APCN.

Experimentation is carried out to determine the optimum molecular weight of the PDMS segments. Thus APCNs are prepared using 9,000, 17,000, and 26,000 grams/mole V-PDMS-V. It is determined that 9,000 and 26,000 grams/mole V-PDMS-V inefficiently crosslinks and yields products of poor mechanical properties (rigid products and macrophase separation, respectively). Membranes that are prepared with 17,000 grams/mole V-PDMS-V give the best overall properties and efficient syntheses.

Composition of the Co-Network:

It is known in the art that the equilibrium water swelling of APCNs is affected by the hydrophilic polymer content. At lower hydrophilic contents (10-30%) water swelling increases are usually more pronounced than at higher hydrophilic contents (>40%) where the swelling ratio increase is directly proportional to the composition, i.e., the swelling ratio of the hydrophilic domain reaches a limiting value. While not wishing to be bound to any one theory, it is determined that the water swelling ratios of membranes according to the present invention seem to comply to this general rule since the equilibrium water swelling of the PDMAAm domain increased only 30% (from 104% to 133%) as the PDMAAm content of the co-network is increased from 31.5% to 45% (see the data contained in Table 2). These swelling results indicate that by increasing the PDMAAm content of the co-networks only a very limited improvement can be made in terms of diffusion properties (by the increase in the volume fraction of the hydrophilic channels which is already at 66%, in the case of the 50-H network), and such an increase would yield a significant decrease in the PDMS volume fraction (already at 34%, in the case of the 50-H network) which would severely decrease oxygen permeability.

Figure 8:
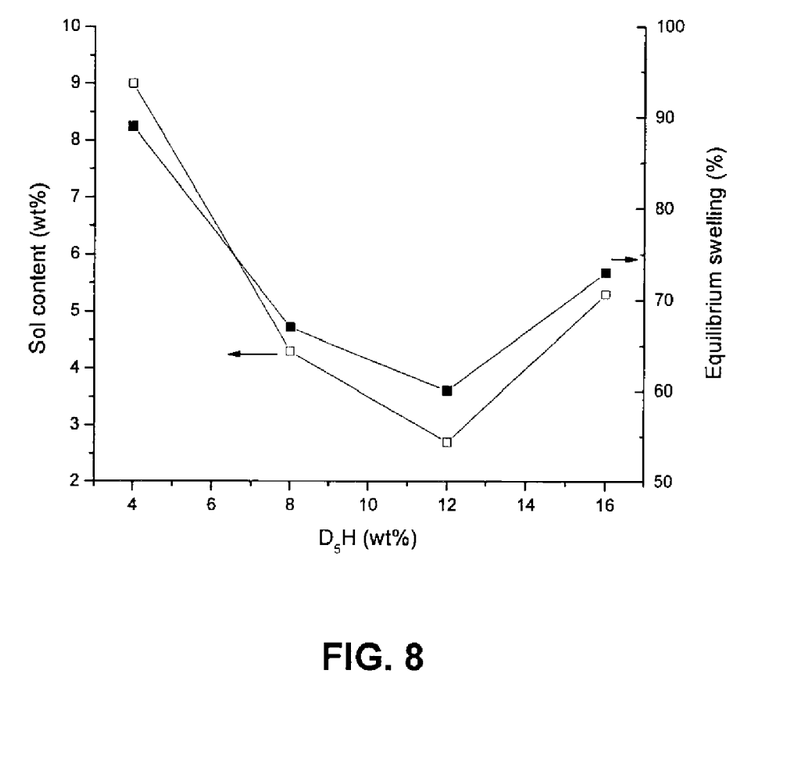
FIG. 8 is a graph of the sol contents and swelling ratios of APCNs prepared from a G50-1600 graft with different crosslinker concentrations (4, 8, 13, and 16%).

The Effect of Crosslinker ($D_5H$ or PMHS) Concentration:

Since, in some embodiments, the extent of crosslinking is critical for APCN properties, experiments are carried out to determine optimum crosslinker concentrations. The use of stoichiometric quantities of SiH relative to Si—CH=CH$_2$ gave insufficient crosslinking; however, charges with —SiH/Si—CH=CH$_2$ of approximately 5 (1 to 2 wt % $D_5H$ or PMHP) gave co-networks with appropriate swelling and mechanical properties. A series of model experiments are carried out in which are added various amounts (from 4% to 15%) of $D_5H$ to V-PDMS-V charges and the extent of crosslinking is assessed by determining sol content and equilibrium water swelling (see Table 1). FIG. 8 summarizes these findings. The best overall results are obtained with approximately 12% $D_5H$. Similar experiments with PMHS (not shown) indicated optimum crosslinking with approximately 10% PMHS. These results are taken into consideration in the synthesis of APCNs.

Effect of the Molecular Weight of the [PDMAAm (PDMS)]-g-PDMS Graft Copolymer:

In one instance, the molecular weight of the graft can be controlled by the AIBN concentration, i.e., the Mw of the product can be decreased by increasing AIBN concentration. Swelling data obtained with co-networks prepared from grafts made with different monomer/AIBN ratios (400, 800 and 1600) but crosslinked under identical conditions (grafts with 50% PDMAAm and crosslinked with 10% PMHS) indicate that co-networks prepared with higher molecular weight grafts exhibit lower water swelling ratios probably because of lower concentration of dangling PDMAAm chain ends (see Table 2).

Morphology Modification of APCNs by Blending and Extraction of Homo-PDMAAm:

High water uptake of immunoisolatory membranes is essential for the rapid permeation of aqueous solutions. The present invention makes possible a procedure to increase the water permeability of APCN membranes by enlarging the volumes of the hydrophilic domains while maintaining domain bi-continuity. While not wishing to be bound to any one theory, it is believed that the hydrophilic domains in the present invention's APCNs could be enlarged and thus their permeabilities to aqueous penetrants increased by adding to graft charges homo-PDMAAm, crosslinking the charges, and after the morphology has stabilized, removing the added homo-PDMAAm from the APCN by extraction with water. The homo-PDMAAm is expected to blend with the network-PDMAAm and thus to increase the volume fraction of the hydrophilic domain. The enlarged hydrophilic volume fraction is permanently fixed upon crosslinking and renders the morphology more permeable to aqueous systems.

Thus a series of experiments is carried out in which 5.1, 9.6, 17.5 and 27.1 weight percent homo-PDMAAm is added to the charges, and after the morphology of the network has stabilized (i.e., after crosslinking) the added homo-PDMAAm is removed by water extraction. In this manner, one is able to more than double the swelling ratio of the membranes without increasing the amount of covalently linked PDMAAm (increasing the amount of network-PDMAAm would have reduced the volume fraction of PDMS, which is undesirable). Membranes modified by this technique exhibited much higher water swelling (see the data in Table 2), and glucose and insulin permeabilities.

Although the invention has been described in detail with particular reference to certain embodiments detailed herein, other embodiments can achieve the same results. Variations and modifications of the present invention will be obvious to those skilled in the art and the present invention is intended to cover in the appended claims all such modifications and equivalents.

What is claimed is:

1. A multicomponent network comprising the reaction product of at least one acrylamide homopolymer, at least one di-alkenyl or di-alkynyl terminated polysiloxane polymer and a crosslinking according to Formula (IV):

(IV)

2. The multicomponent network of claim 1, wherein the at least one acrylamide homopolymer is selected from one or more dimethylacryamide polymers.

3. The multicomponent network of claim 2, wherein the at least one acrylamide homopolymer is a poly(N,N-dimethyl acrylamide (PDMAAm)) polymer.

4. The multicomponent network of claim 3, wherein the at least one acrylamide homopolymer is a poly(N,N-dimethyl acrylamide (PDMAAm)) polymer according to Formula (I):

(I)

where n is equal to an integer in the range of about 5 to about 5,000.

5. The multicomponent network of claim 4, where n is equal to an integer in the range of about 10 to about 2,500.

6. The multicomponent network of claim 4, where n is equal to an integer in the range of about 25 to about 1,000.

7. The multicomponent network of claim 4, where n is equal to an integer in the range of about 40 to about 500.

8. The multicomponent network of claim 1, wherein the at least one di-alkenyl or di-alkynyl terminated polysiloxane polymer is selected from any polymer according to Formula (III):

(III)

where p is equal to an integer in the range of about 5 to about 5,000, where $R_1$ and $R_2$ are independently selected from $C_1$ to $C_6$ alkyl groups, and where $R_3$ and $R_4$ are independently selected from $C_2$ to $C_{10}$ alkenyl groups or $C_2$ to $C_{10}$ alkynyl groups.

9. The multicomponent network of claim 8, where p is equal to an integer in the range of about 10 to about 2,500.

10. The multicomponent network of claim 8, where p is equal to an integer in the range of about 25 to about 1,000.

11. The multicomponent network of claim 8, where p is equal to an integer in the range of about 40 to about 500.

12. The multicomponent network of claim 8, where $R_1$ and $R_2$ are independently selected from $C_1$ to $C_4$ alkyl groups.

13. The multicomponent network of claim 8, where $R_1$ and $R_2$ are both selected from methyl groups, propyl groups or butyl groups.

14. The multicomponent network of claim 8, where $R_3$ and $R_4$ are independently selected from $C_2$ to $C_7$ alkenyl groups or $C_2$ to $C_7$ alkynyl groups.

15. The multicomponent network of claim 8, where $R_3$ and $R_4$ are independently selected from $C_2$ to $C_5$ alkenyl groups or $C_2$ to $C_5$ alkynyl groups.

16. The multicomponent network of claim 8, where $R_3$ and $R_4$ are both vinyl groups.

17. The multicomponent network of claim 1, wherein the at least one di-alkenyl or di-alkynyl terminated polysiloxane polymer is selected from any polymer according to Formula (II):

(II)

where m is equal to an integer in the range of about 5 to about 5,000.

18. The multicomponent network of claim 17, where m is equal to an integer in the range of about 10 to about 2,500.

19. The multicomponent network of claim 17, where m is equal to an integer in the range of about 25 to about 1,000.

20. The multicomponent network of claim 17, where m is equal to an integer in the range of about 40 to about 500.

21. A method for forming an amphiphilic network or co-network comprising the steps of:
(A) combining at least one acrylamide homopolymer and at least one di-alkenyl or di-alkynyl terminated polysiloxane polymer to form a polymer mixture;
(B) adding a crosslinking composition to the polymer mixture of Step (A) to form a polymer-crosslinker mixture, the one crosslinking composition having a chemical formula according to Formula (IV):

(IV)

and
(C) subjecting the polymer-crosslinker mixture to crosslinking to yield a crosslinked amphiphilic network or co-network.

22. The method of claim 21, where the crosslinking reaction of Step (C) utilizes at least one catalyst.

23. The method of claim 22, where the at least one catalyst is selected from at least one platinum catalyst.

24. The method of claim 21, wherein the at least one acrylamide homopolymer is selected from one or more dimethylacryamide polymers.

25. The method of claim 24, wherein the at least one acrylamide homopolymer is a poly(N,N-dimethyl acrylamide (PDMAAm)) polymer.

26. The method of claim 25, wherein the at least one acrylamide homopolymer is a poly(N,N-dimethyl acrylamide (PDMAAm)) polymer according to Formula (I):

(I)

where n is equal to an integer in the range of about 5 to about 5,000.

27. The method of claim 26, where n is equal to an integer in the range of about 10 to about 2,500.

28. The method of claim 26, where n is equal to an integer in the range of about 25 to about 1,000.

29. The method of claim 26, where n is equal to an integer in the range of about 40 to about 500.

30. The method of claim 21, wherein the at least one di-alkenyl or di-alkynyl terminated polysiloxane polymer is selected from any polymer according to Formula (III):

(III)

where p is equal to an integer in the range of about 5 to about 5,000, where $R_1$ and $R_2$ are independently selected from $C_1$ to $C_6$ alkyl groups, and where $R_3$ and $R_4$ are independently selected from $C_2$ to $C_{10}$ alkenyl groups or $C_2$ to $C_{10}$ alkynyl groups.

31. The method of claim 30, where p is equal to an integer in the range of about 10 to about 2,500.

32. The method of claim 30, where p is equal to an integer in the range of about 25 to about 1,000.

33. The method of claim 30, where p is equal to an integer in the range of about 40 to about 500.

34. The method of claim 30, where $R_1$ and $R_2$ are independently selected from $C_1$ to $C_4$ alkyl groups.

35. The method of claim 30, where $R_1$ and $R_2$ are both selected from methyl groups, propyl groups or butyl groups.

36. The method of claim 30, where $R_3$ and $R_4$ are independently selected from $C_2$ to $C_7$ alkenyl groups or $C_2$ to $C_7$ alkynyl groups.

37. The method of claim 30, where $R_3$ and $R_4$ are independently selected from $C_2$ to $C_5$ alkenyl groups or $C_2$ to $C_5$ alkynyl groups.

38. The method of claim 30, where $R_3$ and $R_4$ are both vinyl groups.

39. The method of claim 21, wherein the at least one di-alkenyl or di-alkynyl terminated polysiloxane polymer is selected from any polymer according to Formula (II):

(II)

where m is equal to an integer in the range of about 5 to about 5,000.

40. The method of claim 21, where m is equal to an integer in the range of about 10 to about 2,500.

41. The method of claim 21, where m is equal to an integer in the range of about 25 to about 1,000.

42. The method of claim 21, where m is equal to an integer in the range of about 40 to about 500.

43. A crosslinked network or co-network produced according to the method of claim 21.

44. A multicomponent network comprising the reaction product of:
(i) at least one acrylamide polymer according to Formula (I):

(I)

where n is equal to an integer in the range of about 5 to about 5,000

(ii) at least one di-alkenyl or di-alkynyl terminated polysiloxane polymer according to Formula (II):

(II)

where m is equal to an integer in the range of about 5 to about 5,000; and (iii) a crosslinking according to Formula (IV):

(IV)

45. The multicomponent network of claim 44, where n is equal to an integer in the range of about 10 to about 2,500.

46. The multicomponent network of claim 44, where n is equal to an integer in the range of about 25 to about 1,000.

47. The multicomponent network of claim 44, where n is equal to an integer in the range of about 40 to about 500.

48. The multicomponent network of claim 44, where m is equal to an integer in the range of about 10 to about 2,500.

49. The multicomponent network of claim 44, where m is equal to an integer in the range of about 25 to about 1,000.

50. The multicomponent network of claim 44, where m is equal to an integer in the range of about 40 to about 500.

* * * * *